United States Patent [19]

Forrester

[11] Patent Number: 5,336,044

[45] Date of Patent: Aug. 9, 1994

[54] BLADE CONTAINMENT SYSTEM AND METHOD

[75] Inventor: James M. Forrester, Centerville, Ohio

[73] Assignee: General Electric Company, Cincinnati, Ohio

[21] Appl. No.: 102,922

[22] Filed: Aug. 6, 1993

[51] Int. Cl.5 .................................. F01D 25/24
[52] U.S. Cl. .................................. 415/9; 415/196
[58] Field of Search .............. 415/196, 9, 200

[56] References Cited

U.S. PATENT DOCUMENTS

| | | | |
|---|---|---|---|
| 2,987,296 | 6/1961 | Ferguson | 415/9 |
| 3,241,813 | 3/1966 | Von Flue et al. | 415/9 |
| 4,149,824 | 4/1979 | Adamson | 415/9 |
| 4,377,370 | 3/1983 | Porcelli | 415/9 |
| 4,534,698 | 8/1985 | Tomich | 415/9 |
| 5,160,248 | 11/1992 | Clarke | 415/9 |
| 5,188,505 | 2/1993 | Schilling et al. | 415/9 |
| 5,267,828 | 12/1993 | Lenhart et al. | 415/9 |
| 5,273,393 | 12/1993 | Jones et al. | 415/9 |

*Primary Examiner*—Edward K. Look
*Assistant Examiner*—Mark Sgantzos
*Attorney, Agent, or Firm*—Jerome C. Squillaro; John R. Rafter

[57] ABSTRACT

A blade containment system and method for use in a gas turbine engine having a plurality of blades mounted on a rotatable disk. The system comprises an annular casing in surrounding relationship with the blades and a plurality of panels, each having an interior noise absorbing structure and an outer containment structure, disposed about an interior surface of the casing so as to position the panels outward and forward of the blades. The panels are supported so as to fix the panels with respect to the casing during normal engine operation and to allow an impacted one of the panels to slide circumferentially when acted upon by a predetermined blade force caused by a released portion of one of the blades impacting the panel. Ramps formed in each end of the containment structure of each panel allow the impacted panel to slidingly engage at least a circumferentially adjacent one of the panels when acted upon by the predetermined blade force.

10 Claims, 4 Drawing Sheets

BLADE CONTAINMENT SYSTEM AND METHOD

BACKGROUND OF THE INVENTION

1. Field of the Invention

The present invention relates generally to gas turbine engines and, more particularly, to a blade containment system and method for use in gas turbine engines.

2. Related Art

Conventional high bypass ratio turbofan engines, which are included in the more general category of gas turbine engines and which may be used for aircraft propulsion, typically include a fan, booster, high pressure compressor, combustor, high pressure turbine, and low pressure turbine in serial axial flow relationship about a longitudinal centerline axis of the engine. The high pressure turbine is drivingly connected to the high pressure compressor via a first rotor shaft, and the low pressure turbine is drivingly connected to both the fan and booster via a second rotor shaft. The fan includes an annular disk and a plurality of radially extending blades mounted on the disk, wherein the disk and the blades are rotatable about the longitudinal centerline of the engine. The engine further includes an annular casing which surrounds the blades in radially spaced relationship. Furthermore, in order to attenuate noise emanating from the engine, the engine typically includes a plurality of circumferentially segmented acoustic panels which are disposed about the interior surface of the annular casing in a location which is axially forward of the blades. The acoustic panels are typically made of a relatively light construction which includes a perforated composite facesheet adjacent the engine flowpath, a honeycomb structure bonded to the facesheet wherein the honeycomb structure is typically sub-divided into two portions separated by a septum, and a radially outer composite backsheet which is bonded to the honeycomb structure.

Gas turbine engines typically operate at relatively high rotational speeds and, for high bypass ratio turbofans the fan blades typically include a relatively large radially extending length. Consequently, the fan blades possess relatively high kinetic energy even when the blades are fabricated using lightweight alloys or composite materials. Containment of fan blades has been a continuing problem for the industry and it has been particularly problematic in the area of the engine immediately forward of the blades for the following reasons. During engine operation various known events may occur, such as blade contact with foreign or domestic objects, which may cause a blade to be released from the fan disk. The first released blade typically contacts the outer containment structure located directly outward of the blades in such a manner that the impact load from the blade is distributed over an area of the casing corresponding to the full chord length of the blade tip. However, in a known scenario the platform portion of the first released blade contacts a trailing blade in the area between the midspan shroud and the platform portion of the trail blade such that approximately the outer two-thirds of the trail blade is severed and recoils forward such that the trailing edge corner of the tip of the trail blade impacts the acoustic panels positioned forward of the blades. The trailing edge tip corner of the trail blade may then effectively act as a cutting tool resulting in significant damage to not only the acoustic panels but to the surrounding containment structure comprising the annular casing as well. Various devices have been used previously to provide containment of fan blades in general, and to provide containment of fan blades in the area forward of the fan blades in particular.

One prior method of providing containment of fan blades in the area of the engine forward of the fan blades may be referred to as "static containment", wherein the annular fan casing is manufactured from a high strength material having an adequate radially extending shell thickness to absorb the kinetic energy or the impacting fan blade and thereby contain the blade. While the "static containment" system has proven to be an effective means for containing fan blades in the region of the engine forward of the fan blades, it is not weight efficient.

Another prior method of containing blades of turbomachinery, at least with respect to the area of the engine immediately outward of the rotating blades, is disclosed in U.S. Pat. No. 4,149,824 to Adamson which is assigned to the assignee of the present invention. Adamson discloses a high-strength annular ring which is supported in radially spaced relationship over a stage of rotating blades, wherein the annular ring is supported within a support structure in such a manner that when the ring is impacted or contacted by a blade with a predetermined impact force, energy associated with the blade is absorbed by imparting spin to the annular ring with respect to the stationary support structure. While the Adamson device is effective in certain applications, it has its limitations. Any dynamic containment device employing an annular ring, such as that disclosed in Adamson, does not lend itself to field retrofit applications wherein the fan casing is manufactured by a process, such as an extrusion process, which produces relatively large diametral tolerances associated with the interior surface of the fan casing. The use of an annular ring in such a field retrofit application would either require machining of the interior surface of the fan casing which would be very expensive, or, if the casing was not machined could result in excessive radial clearances between the annular ring and the fan casing which would not be structurally sound and could in turn cause a fan rotor vibratory response resulting in premature blade failure.

In view of the foregoing, prior to this invention a need existed for an improved blade containment system to resolve the problems associated with prior containment systems and thereby provide increased capability for containment of blades in a cost and weight efficient manner.

SUMMARY OF THE INVENTION

The present invention is directed to a blade containment system and method in a gas turbine engine having a plurality of radially extending blades mounted on an annular disk, the blades and disk being rotatable about a longitudinal axis of the engine.

According to a preferred embodiment of the present invention, the blade containment system comprises an annular casing positioned radially outward of the blades and in surrounding relationship with the blades. The blade containment system further comprises a plurality of circumferentially segmented panels disposed about an interior surface of the casing, the panels being radially outward of the blades. The blade containment system further comprises a means for supporting the panels so as to fix each of the panels with respect to the casing during normal operation of the engine and so as to allow an impacted one of the panels to slide circumferentially when the impacted panel is acted upon by a predetermined blade force caused by a released portion of one of the blades impacting the impacted panel. The system further comprises ramp means for allowing the impacted panel to slidingly engage at least a circumferentially adjacent one of the panels when the impacted panel is impacted by the released blade portion so as to dissipate kinetic energy of the released blade portion.

According to another preferred embodiment of the present invention the blade containment system comprises the following additional structural features and function. The plurality of circumferentially segmented panels are disposed about a forward portion of the interior surface of the casing. The ramp means comprises a radially outward facing ramp formed in a circumferentially facing end of each of the panels and a radially inward facing ramp formed in an opposite circumferentially facing end of each of the panels, the panels being disposed so as to position the radially outward facing ramp of each of the panels circumferentially adjacent to the radially inward facing ramp of an adjacent one of the panels. The ramp means causes the impacted panel to be forced radially inward of the circumferentially adjacent one of the panels when the impacted panel is acted upon by the predetermined blade force. Each of the panels comprises a radially outer containment structure and a radially inner noise absorbing structure, with the inner noise absorbing structure being bolted to the outer containment structure. The radially outward facing ramp and the radially inward facing ramp of each of the panels extend through the outer containment structure. The noise absorbing structure of each of the panels is sub-divided into a radially inner portion and an radially outer portion, wherein the inner and outer portions are separated by a septum. The means for supporting comprises a plurality of bushings bonded to each of the panels, wherein each of the bushings includes a hole for accepting a shear bolt, and a plurality of nut plates fixedly attached to an exterior surface of the casing, wherein each of the nut plates secures a corresponding one of the shear bolts.

BRIEF DESCRIPTION OF THE DRAWINGS

The structural features and function, as well as the method steps, of the present invention will become more apparent from the following detailed description of the preferred embodiments when taken in conjunction with the accompanying drawings in which.

DETAILED DESCRIPTION

Figure 1:
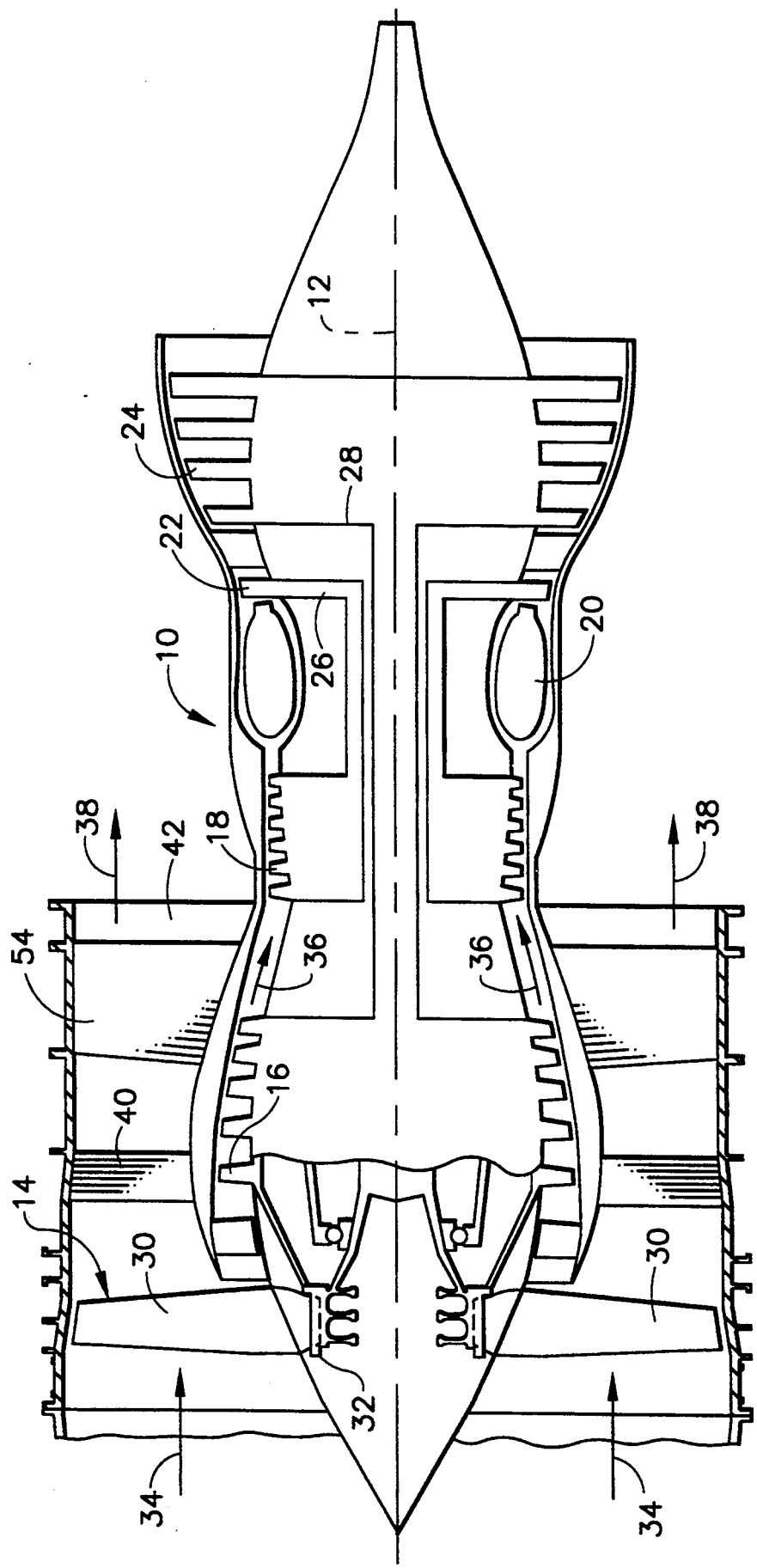
FIG. 1 is a longitudinal cross-section illustrating an exemplary high bypass ratio turbofan engine incorporating the blade containment system of the present invention.

Referring now to the drawings, wherein like reference numerals have been used for similar elements throughout, FIG. 1 illustrates a longitudinal cross-section of an exemplary high bypass ratio turbofan engine 10. The engine 10 includes, in serial axial flow communication about a longitudinal centerline axis 12, conventional structures including a fan rotor 14, booster 16, high pressure compressor 18, combustor 20, high pressure turbine 22, and low pressure turbine 24. High pressure turbine 22 is drivingly connected to high pressure compressor 18 with a first rotor shaft 26 and low pressure turbine 24 is drivingly connected to both the booster 16 and fan rotor 14 with a second rotor shaft 28. Fan rotor 14 comprises a plurality of radially extending blades 30 mounted on an annular disk 32, wherein disk 32 and blades 30 are rotatable about the longitudinal centerline axis 12 of engine 10.

During operation of engine 10 ambient air 34 enters the engine inlet and a first portion, denoted the primary or core gas stream 36, passes through fan rotor 14, booster 16 and high pressure compressor 18, being pressurized by each component in succession. Primary gas stream 36 then enters combustor 20 where the pressurized air is mixed with fuel to provide a high energy gas stream. The high energy gas stream then enters in succession high pressure turbine 22 where it is expanded, with energy extracted to drive high pressure compressor 18, and low pressure turbine 24 where it is further expanded, with energy being extracted to drive fan rotor 14 and booster 16. A second portion of ambient air 34, denoted the secondary or bypass airflow 38, passes through fan rotor 14 and fan outlet guide vanes 40 before exiting the engine through annular duct 42, wherein secondary airflow 38 provides a significant portion of the engine thrust.

Figure 2:
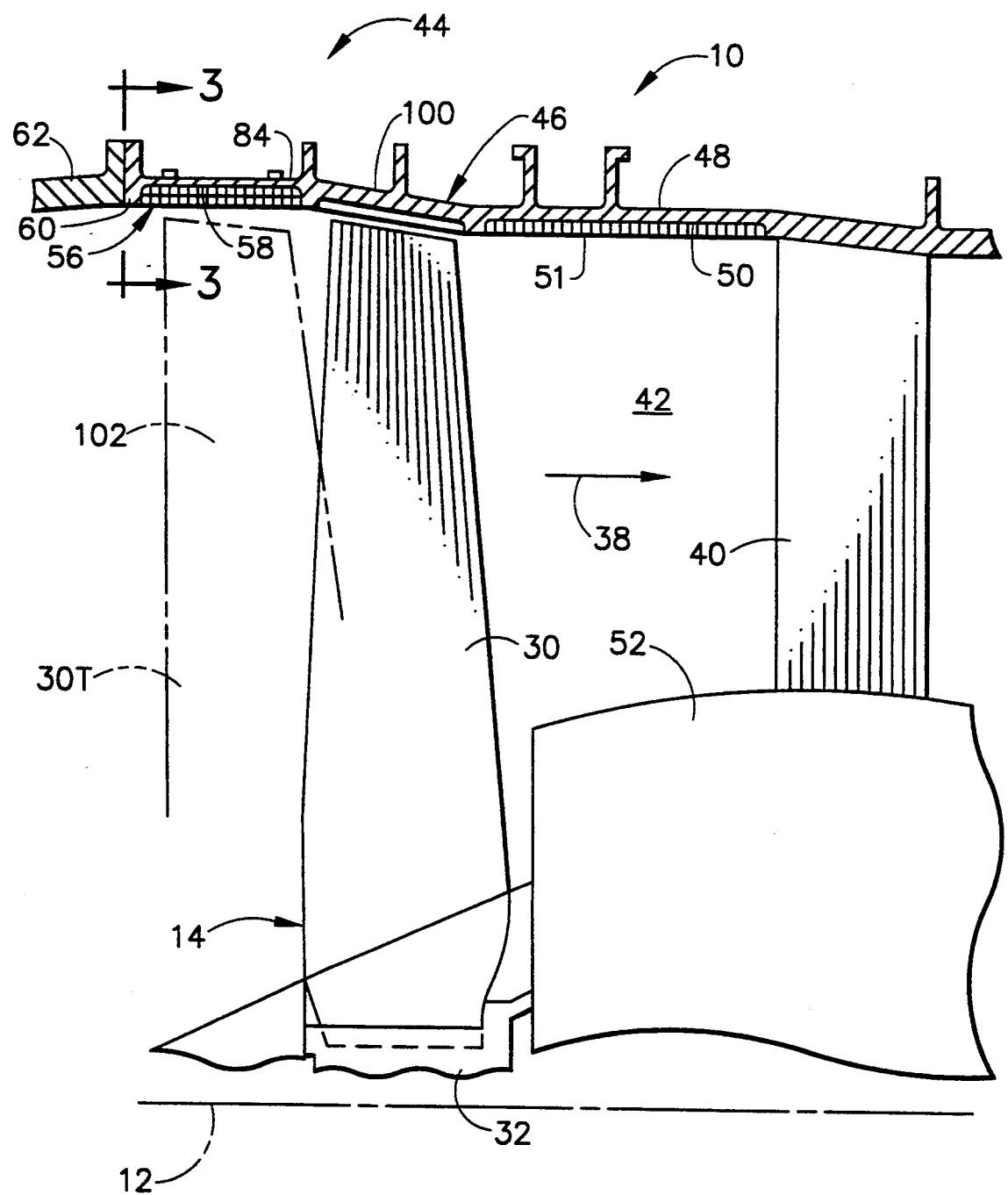
FIG. 2 is an enlarged fragmentary longitudinal cross-section illustrating the blade containment system of the present invention.

FIG. 2 is an enlarged fragmentary longitudinal cross-section of the engine of FIG. 1 illustrating the blade containment system, generally depicted at 44, of the present invention. The blade containment system 44 comprises an annular casing 46 which is positioned radially outward of blades 30 and in surrounding relationship with blades 30 (one of which is shown in FIG. 2). Casing 46 comprises an exterior surface 48 and an interior surface 50. A conventional noise absorbing structure 51 is attached to interior surface 50 of casing 46 and is disposed axially between blades 30 and outlet guide vanes 40. Noise absorbing structure 51 forms a portion of an outer boundary for the flow of bypass airflow 38 through annular duct 42, wherein an inner boundary of duct 42 is formed by core cowling 52. In a preferred embodiment casing 46 is made of 18-3 steel using an extrusion process, wherein interior surface 50 comprises an as-extruded surface resulting in relatively large diametral tolerance variations around the circumference of surface 50 at any given axial location as compared to the diametral tolerances of a comparably sized casing having a machined interior surface. However, it should be understood that casing 46 may be made of other high strength alloys and that processes other than an extrusion process may be utilized. Furthermore, interior surface 50 may be machined if desired. Fan outlet guide vanes 40 extend across annular duct 42, being connected at an outer end to casing 46 and at an inner end to cowling 52, for the purpose of removing swirl from airflow 38 in a conventional manner. A plurality of structural support struts 54 (shown in FIG. 1) extend radially across annular duct 42 and are attached at an outer end to casing 46 and at an inner end to core cowling 52, thereby providing a structural link between cowling 52 and fan casing 46.

The blade containment system 44 further comprises a plurality of circumferentially segmented panels 56 (only one shown in FIG. 2) which are disposed in circumferentially abutting relationship with one another about a forward portion 58 of the interior surface 50 of casing 46 so as to position panels 56 radially outward of and axially forward of blades 30. Panels 56 are axially adjacent to forward flange 60 of casing 46 which is attached to an inlet structure 62.

Figure 3:
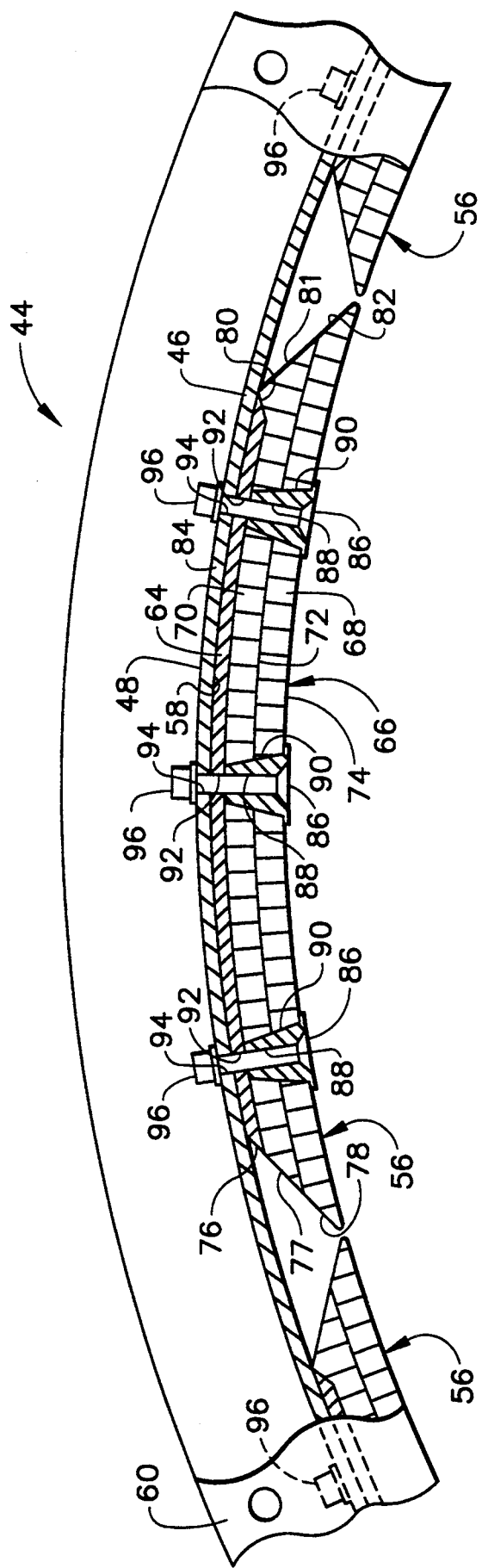
FIG. 3 is an axial view, with a portion of the fan casing cutaway, illustrating one of the circumferentially segmented panels of the blade containment system.

Referring now to FIG. 3, panels 56 of the blade containment system 44 are further illustrated. In a preferred embodiment, the blade containment system 44 comprises a total of six of the circumferentially segmented panels. However, other quantities of panels 56 may be utilized within the scope of the present invention. Each of the panels 56 comprises a radially outer containment structure 64 and a radially inner noise absorbing structure 66, wherein noise absorbing structure 66 is bolted to outer containment structure 64 as subsequently discussed. In a preferred embodiment containment structure 64 is made of 304L steel. However, it should be understood that containment structure 64 may be made of other metallic alloys or of non-metallic materials provided that the selected material has ballistic properties equal to or greater than those of 304L steel and provided that the material is otherwise suitable for use in engine 10, wherein such materials include, but are not limited to, certain aluminum alloys and graphite composite materials. Noise absorbing structure 66 is utilized to attenuate noise emanating from engine 10 and preferably noise absorbing structure 66 of each panel 56 is sub-divided into a radially inner portion 68 and a radially outer portion 70, wherein inner portion 68 and outer portion 70 are separated by a septum 72. Noise absorbing structure 66 further includes a perforated facesheet 74 made of a composite material which is bonded to radially inner portion 68 of noise absorbing structure 66, wherein facesheet 74 is adjacent the bypass airflow 38. In a preferred embodiment, inner and outer portions 68 and 70, respectively, are made of a phenolic resin material known as NOMEX which is manufactured by the DuPont Chemical Company. However, inner and outer portions 68 and 70, respectively, may be manufactured from other materials including a metallic honeycomb structure. Composite facesheet 74, inner portion 68 of noise absorbing structure 66, composite septum 72 and outer portion 70 of noise absorbing structure 66 absorb noise emanating from engine 10 in a conventional manner by providing a multiple degrees-of-freedom noise attenuation structure.

Each of the panels 56 includes a radially outward facing ramp 76 formed in a circumferentially facing end 78 and a radially inward facing ramp 80 formed in an opposite circumferentially facing end 82. As shown in FIG. 3, radially outward facing ramp 76 and radially inward facing ramp 80 of each panel 56 extend through containment structure 64, wherein ramps 76 and 80 comprise oppositely disposed circumferentially facing end surfaces of containment structure 64. Panels 56 are disposed about the forward portion 58 of interior surface 50 of casing 46 such that the radially outward facing ramp 76 of each panel 56 is circumferentially adjacent to the radially inward facing ramp 80 of an adjacent one of the panels 56, wherein ramps 76 and 80 perform a subsequently described function. Each of the panels 56 further include a first sloped surface 77 formed in circumferentially facing end 78 and a second sloped surface 81 formed in opposite circumferentially facing end 82, wherein surfaces 77 and 81 are each formed on an angle relative to a radial line and extend through noise absorbing structure 66. Sloped surface 77 may be aligned with radially outward facing ramp 76 if desired but it is not required, and as seen in FIG. 3, sloped surface 81 is not aligned with radially inward facing ramp 80. The angular orientations of sloped surfaces 77 and 81 are selected to facilitate assembly of panels 56, as known in the art, and are not related to the subsequently described function of ramps 76 and 80.

Each panel 56 is supported by a forward portion 84 of casing 46 and is attached to the forward portion 84 of casing 46 using a plurality of shear bolts 86 so as to fix each of the panels 56 with respect to casing 46 during normal operation of engine 10. Each shear bolt 86 is inserted in an interior hole 88 of a bushing 90, wherein bushing 90 is bonded to inner and outer portions 68 and 70, respectively, of noise absorbing structure 66, and is then passed through a hole 92 formed in containment structure 64 and a hole 94 formed in forward portion 84 of casing 46, wherein holes 88, 92 and 94 are aligned with one another. Each shear bolt 86 is then secured with a nut plate 96 which is fixedly attached to the exterior surface 48 of casing 46. Consequently, the noise absorbing structure 66 of each panel 56 is bolted to a corresponding containment structure 64 and each panel 56 is attached to forward portion 84 of casing 46.

Figure 4:
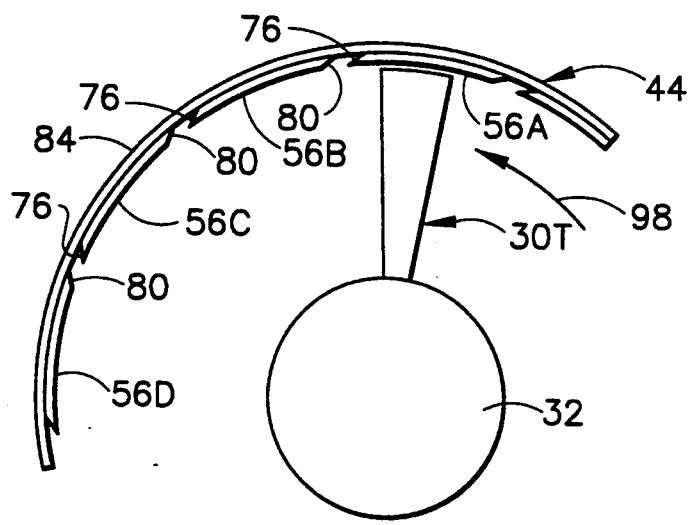
FIG. 4 schematically illustrates the relationship between a blade and the blade containment system during normal engine operation.
Figure 5:
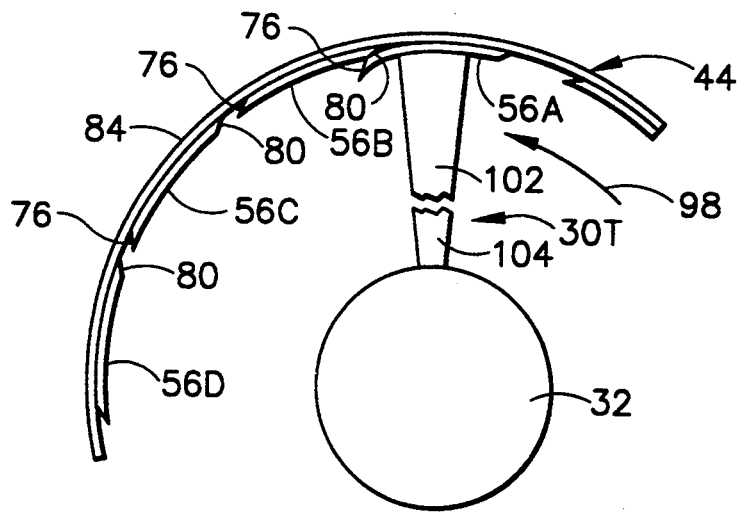
FIG. 5 schematically illustrates the relationship between a blade which has been severed by an initially released blade (not shown) and the blade containment system.
Figure 6:
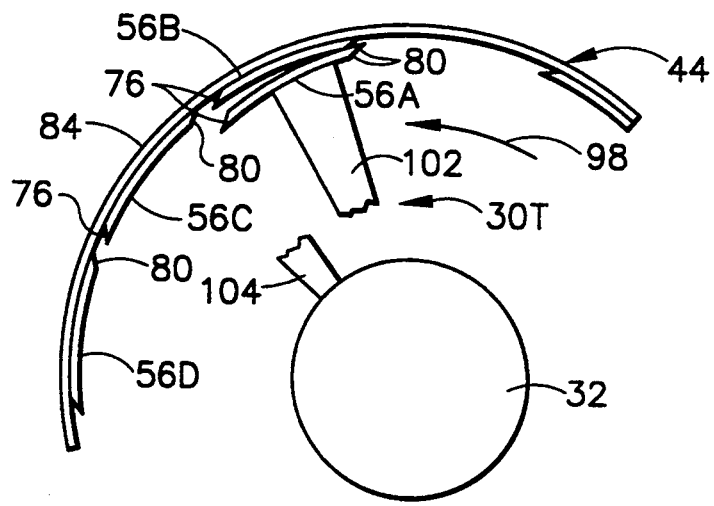
FIG. 6 schematically illustrates a subsequent relationship between the blade of FIG. 5 and the blade containment system.

FIG. 4 schematically illustrates the circumferential relationship between one of the blades 30, which represents a trail blade relative to an initially released blade (not shown) as subsequently discussed and which is denoted 30T, and a circumferentially extending portion of the blade containment system 44 of the present invention, wherein the noise absorbing structure 66 of each panel 56 has been omitted clarity of illustration. FIG. 4 further illustrates the direction of rotation, denoted by arrow 98, of disk 32 and blade 30. During operation of engine 10 one of the blades 30 may be inadvertently released from disc 32 due to contact with a foreign object or due to any one of a number of other known causes. When this occurs the initially released one of the blades 30 typically contacts casing 46 in an area 100 of casing 46 which is axially aligned with blades 30 as shown in FIG. 2. In a known scenario, the initially released one of the blades 30 contacts trail blade 30T which severs trail blade 30T at a location just below a mid-span shroud (not shown) of trail blade 30T and causes a radially outer portion 102 of trail blade 30T, comprising approximately an outer two-thirds of trail blade 30 T, to be recoiled axially forward such that outer portion 102 is axially aligned with panels 56 as shown in FIG. 2. Radially outer portion 102, which is severed from an inner portion 104 of trail blade 30T and which is consequently released from disc 32, impacts one of the panels 56, denoted 56A, due to centrifugal force acting on released outer portion 102 as shown in FIG. 5. Individual ones of the circumferentially segmented panels 56 are illustrated as panels 56A through 56D in FIGS. 4 and 5 wherein panel 56B is circumferentially adjacent to panel 56A, panel 56C is circumferentially adjacent to panel 56B, etc. As best seen in FIG. 4, panels 56 are disposed so as to position the radially outward facing ramp 76 of each panel 56 circumferentially adjacent to the radially inward facing ramp 80 of an adjacent one of panels 56. For instance, radially outward facing ramp 76 of panel 56A is positioned circumferentially adjacent to radially inward facing ramp 80 of panel 56B, radially outward facing ramp 76 of panel 56B is positioned circumferentially adjacent to radially inward facing ramp 80 of panel 56C, etc. Immediately after released outer portion 102 of trail blade 30T impacts panel 56A, the shear bolts 86, which fix panel 56A with respect to casing 46 during normal operation of engine 10, are sheared due to the impacting force of released portion 102 which allows panel 56A to slide circumferentially. Radially outward facing ramp 76 of panel 56A then contacts radially inward facing ramp 80 of panel 56B which allows panel 56A to slidingly engage panel 56B and causes panel 56A to be forced radially inward of panel 56B as shown in FIGS. 5 and 6. Radially outward facing ramp 76 and radially inward facing ramp 80 of each panel 56 must be positioned on each panel 56 with consideration of direction of rotation 98 of disc 32 such that the radially outward facing ramp 76 of an impacted one of the panels 56, illustrated as panel 56A in FIGS. 5 and 6, contacts the radially inward facing ramp 80 of a circumferentially adjacent one of the panels 56, denoted as panel 56B in FIGS. 5 and 6, due to the impacting force of released outer portion 102. Otherwise, the impacting force of released outer portion 102 would cause impacted panel 56A to be driven radially outward into casing 46 and consequently the ability of panel 56A to slide circumferentially would be significantly impeded. The sliding engagement of panels 56A and 56B causes the kinetic energy of released outer portion 102 of trail blade 30T to be dissipated. Due to the relatively high strength of the containment structure 64 of each panel 56 relative to the relatively low strength of the noise absorbing structure 66 of each panel 56 and due to the impacting force of outer portion 102 of trail blade 30T, it is probable that containment structure 64 of panel 56A will cause the noise absorbing structure 66 of panel 56B to be severed, thereby causing a sliding engagement of the outer containment structure 64 of each of panels 56A and 56B. Panel 56A and released outer portion 102 of trail blade 30T continue to travel together circumferentially wherein panel 56A slidingly engages consecutive ones of panels 56 such as panels 56C and panel 56D until the kinetic energy of released outer portion 102 is completely dissipated. The sliding engagement of panel 56A with circumferentially adjacent panel 56B, and possibly with other ones of panels 56, deflects the impacting released outer portion 102 of trail blade 30T and translates the damaging radial kinetic energy of outer portion 102 into less damaging tangential kinetic energy. Furthermore, the sliding action of panel 56A and released outer portion 102 applies the radial load due to the radial kinetic energy of released outer portion 102 over a relatively large area of casing 46 corresponding to an outer surface of containment structure 64 of panel 56A. Consequently, the impacting penetrating stress imposed upon casing 46 by released outer portion 102 is reduced relative to prior "static containment" structures wherein the impacting penetrating stress may be applied to an area of casing 46 corresponding to a trailing edge corner of the tip of outer portion 102.

The dynamic containment features of the blade containment system 44 of the present invention result in a significant weight reduction relative to prior "static containment" systems as demonstrated by the following illustrative example of a preferred embodiment. In a preferred embodiment twelve shear bolts 86 are utilized to attach each panel 56 to forward portion 84 of casing 46, wherein each of the shear bolts 86 are manufactured from a steel alloy having a tensile strength of approximately 120 KSI and each bolt 86 comprises a diameter of 0.25 inches. It should be understood however that other numbers, sizes and materials of shear bolts 86 may be used. Using the foregoing information in conjunction with known equations for determining area and torque as well as the known conversion factor of 0.57 for determining shear stress capability of a metal given the tensile stress capability, the energy required to shear twelve of shear bolts 86 may be computed to be approximately 840 ft-lbs. Consequently, the energy required to shear the shear bolts 86 attaching panel 56A to forward portion 84 of casing 46 is negligible as compared to the kinetic energy of released outer portion 102 of trail blade 30T which may be computed to be approximately 138,500 ft-lbs using known equations for converting angular speed to linear velocity and for determining kinetic energy, in conjunction with the following constants:

| | |
|---|---|
| Angular speed of disc 32 and blades 30 at a representative high speed operation of engine 10 = | 4180 rev/min |
| Typical weight of released outer portion 102 of trail blade 30T = | 5.8 lbs |
| Radius of the center of gravity of trail blade 30T = | 34 inches |

The thickness of an engineered containment system to encapture a released blade or blade fragment, which in this example corresponds to released outer portion 102 of trail blade 30T, may be computed from the following equation:

$$TCM = KS[(KEB)(EF)]^{\frac{1}{2}}$$

wherein:
TCM = Minimum engineered containment thickness (when applied to the present invention TCM is the sum of a radial thickness of containment structure 64 of panel 56 and a radial thickness of forward portion 84 of casing 46).
KS = Containment constant equal to 0.000835, which is applicable with the use of stainless steel containment structures. The value of KS will vary when other materials are used.
KEB = Kinetic energy of released blade portion 102.
EF = Engineering factor equal to 1.1

In a "static containment" system without the benefit of the present invention or other containment enhancements, the foregoing equation and the previously calculated kinetic energy of released blade portion 102 of approximately 138,500 ft-lbs may be used to compute TCM to be 0.325 inches. An additional engineering factor of up to 2.0 may be employed, depending on the configuration of the containment system or other considerations, in which the actual minimum engineered containment thickness in the present example is calculated to be 0.650 inches when using a "static containment" system which does not employ the present invention or other containment enhancements. Utilizing the dynamic containment features of blade containment system 44, the engineered containment thickness of system 44, and consequently the weight of system 44, may be significantly reduced relative to the "static containment" structure as demonstrated by the following. Using an iterative process, the inventor determined an optimum weight of each of panels 56 to be approximately 7.1 lbs, with a radial thickness of containment structure 64 of 0.114 inches, in a preferred embodiment having six panels 56 and a radial thickness of forward portion 84 of casing 46 of 0.195 inches. Since impacted panel 56A is initially at rest, prior to contact with released blade portion 102, and since panel 56A and released blade portion 102 obtain the same velocity after impact, known conservation of momentum equations may be used to compute a velocity of both panel 56A and released blade portion 102 after impact to be approximately 558 ft/sec. The known equation for kinetic energy may then be used to compute the kinetic energy of blade portion 102 to be approximately 28,000 ft-lbs which is significantly less than the kinetic energy of approximately 138,500 ft-lbs of blade portion 102 which must be absorbed by a "static containment" system. Using the aforementioned equation for TCM, the minimum engineered containment thickness may be computed to be 0.147 inches, which translates to a calculated thickness of 0.294 inches when the aforementioned additional engineering factor, having a value of 2.0, is applied. The total thickness of forward portion 84 of casing 46 and containment structure 64 is 0.309 inches which exceeds the minimum engineered containment thickness and is significantly less than the previously computed containment thickness of 0.650 inches using a "static containment" system. Consequently, the use of the blade containment system 44 of the present invention results in a significant weight reduction relative to the prior "static containment" system.

In operation, panels 56 of blade containment system 44 are supported so as to fix each of panels 56 with respect to casing 44 during normal operation of engine 10 and so as to allow an impacted one of panels 56 to slide circumferentially when acted upon by a predetermined force of a released blade or blade portion, such as outer portion 102 of trail blade 30T. Ramp means comprising radially outward facing ramp 76 and radially inward facing ramp 80, which extend through containment structure 64 and are formed in circumferentially facing ends 78 and 82, respectively, of each panel 56 are provided for allowing an impacted one of panels 56 to slidingly engage at least a circumferentially adjacent one of panels 56.

In conclusion, means and method have been provided for maintaining a released blade or blade portion of a gas turbine engine rotor which is weight efficient relative to the prior "static containment" structure and method. Furthermore, although the blade containment system 44 may be advantageously used on new engines, it is particularly advantageous in field retrofit applications wherein the containment capability of an engine may be enhanced while maintaining the noise absorption capability of the engine by replacing the conventional segmented acoustic panels, positioned forward of the fan blades and having a composite backsheet, with the panels 56 of the present invention which each include outer containment structure 64 and inner noise absorbing structure 66. The use of the containment system 44 in such a retrofit application also avoids the expensive machining of the forward portion 58 of interior surface 50 of casing 46 which would be required if an annular ring of a dynamic containment concept were utilized in conjunction with a casing 46 made by a process, such as an extrusion process, which results in relatively large diametral variations around forward portion 58 of interior surface 50 of casing 46 which may be further increased by extensive operation of engine 10.

While the foregoing description has set forth the preferred embodiments of the invention particular detail, it must be understood that numerous modifications, substitutions and changes can be undertaken without departing from the true spirit and scope of the present invention as defined by the ensuing claims. For instance, although panels 56 have been illustrated to be axially forward of blades 30 in a preferred embodiment, panels 56 may be advantageously utilized if positioned axially such that panels 56 are directly outward of blades 30. Furthermore, although the included example illustrates the sizing of panels 56 in the event of a released blade portion 102 impacting one of panels 56 based on a known scenario, panels 56 may be sized to contain an entire released blade. The protection desired to be secured by Letters Patent of the United States for this invention is deemed by the subject matter of the following claims.

What is claimed is:

1. In a gas turbine engine having a plurality of radially extending blades mounted on an annular disk, the blades and disk being rotatable about a longitudinal axis of the engine, a blade containment system comprising:
    a) an annular casing positioned radially outward of the blades and in surrounding relationship with the blades;
    b) a plurality of circumferentially segmented panels disposed about an interior surface of said casing, said panels being radially outward of the blades;
    c) means for supporting said panels so as to fix each of said panels with respect to said forward portion of said casing during normal operation of the engine and so as to allow an impacted one of said panels to slide circumferentially when said impacted panel is acted upon by a predetermined blade force caused by a released portion of one of the blades impacting said impacted panel;
    d) ramp means for allowing said impacted panel to slidingly engage at least a circumferentially adjacent one of said panels when said impacted panel is impacted by the released blade portion so as to dissipate kinetic energy of the released blade portion.

2. The blade containment system as recited in claim 1, wherein:
    a) said plurality of circumferentially segmented panels are disposed about a forward portion of said interior surface of said casing so as to position said panels axially forward of the blades;
    b) said ramp means comprises a radially outward facing ramp formed in a circumferentially facing end of each of said panels and a radially inward facing ramp formed in an opposite circumferentially facing end of each of said panels, said panels being disposed so as to position said radially outward facing ramp of each of said panels circumferentially adjacent to said radially inward facing ramp of an adjacent one of said panels;
    c) said ramp means causes said impacted panel to be forced radially inward of said circumferentially adjacent one of said panels when said impacted panel is acted upon by the predetermined blade force.

3. The blade containment system as recited in claim 2, wherein:
   a) each of said panels comprises a radially outer containment structure and a radially inner noise absorbing structure, said inner noise absorbing structure being bolted to said outer containment structure; said outer containment structure terminating on said radially outward facing ramp and said radially inward facing ramp of each of said panels.

4. The blade containment system as recited in claim 3, wherein said noise absorbing structure of each of said panels is sub-divided into a radially inner portion and a radially outer portion, said inner portion and said outer portion being separated by a septum.

5. The blade containment system as recited in claim 2, wherein said means for supporting comprises a plurality of shear bolts.

6. The blade containment system as recited in claim 5, wherein said means for supporting further comprises:
   a) a plurality of bushings bonded to each of said panels, each of said bushings including a hole for accepting one of said shear bolts;
   b) a plurality of nut plates fixedly attached to an exterior surface of said casing, each of said nut plates securing a corresponding one of said shear bolts.

7. The blade containment system as recited in claim 4, wherein said means for supporting comprises:
   a) a plurality of bushings bonded to each of said panels, each of said bushings including a hole for accepting a shear bolt;
   b) a plurality of nut plates fixedly attached to an exterior surface of said casing, each of said nut plates securing a corresponding one of said shear bolts.

8. A method of containing rotating blades of a gas turbine engine, said method comprising the steps of:
   a) surrounding the rotating blades with an annular casing positioned radially outward of the blades;
   b) disposing a plurality of circumferentially segmented panels about a forward portion of an interior surface of said annular casing such that said panels are positioned radially outward and axially forward of the rotating blades;
   c) supporting said panels so as to fix each of said panels with respect to said casing during normal operation of the engine and so as to allow an impacted one of said panels to slide circumferentially when said impacted panel is acted upon by a predetermined blade force caused by a released portion of one of the blades impacting said impacted panel;
   d) providing ramp means on each of said panels to allow said impacted panel to slidingly engage at least a circumferentially adjacent one of said panels when said impacted panel is impacted by the released blade portion so as to dissipate kinetic energy of the released blade portion.

9. The method as recited in claim 8, wherein:
   a) said step of supporting comprises the step of attaching each of said circumferentially segmented panels to a forward portion of said casing with a plurality of shear bolts;
   b) said step of providing comprises the steps of:
      i) forming a radially outward facing ramp in a circumferentially facing end of each of said panels;
      ii) forming a radially inward facing ramp in an opposite circumferentially facing end of each of said panels;
   c) said step of disposing comprises the step of positioning said panels such that said radially outward facing ramp of each of said panels is circumferentially adjacent to said radially inward facing ramp of an adjacent one of said panels.

10. The method as recited in claim 8, wherein said method further comprises the steps of:
   a) structuring each of said panels to include a radially outer containment structure and a radially inner noise absorbing structure;
   b) bonding said noise absorbing structure of each of said panels to said containment structure of a corresponding one of said panels; and
   c) wherein said step of providing further comprises the steps of:
      i) extending said radially outward facing ramp and said radially inward facing ramp through said outer containment structure of each of said panels;
      ii) causing said impacted panel to be forced radially inward of said circumferentially adjacent one of said panels when said impacted panel is acted upon by the predetermined blade force.

* * * * *